United States Patent [19]

Sherrill

[11] Patent Number: 5,673,653

[45] Date of Patent: Oct. 7, 1997

[54] CHEW TOYS FOR DOMESTIC CARNIVOROUS ANIMALS AND METHOD FOR MAKING SAME

[76] Inventor: Les R. Sherrill, 140 Kailuana Loop, Kailua, Hi. 96734

[21] Appl. No.: 721,348

[22] Filed: Sep. 26, 1996

[51] Int. Cl.[6] .................................................. A01K 29/00
[52] U.S. Cl. ................................................... 119/709
[58] Field of Search .............................. 119/707, 709, 119/710, 711; 446/386

[56] References Cited

U.S. PATENT DOCUMENTS

| | | | |
|---|---|---|---|
| 2,185,547 | 1/1940 | Fowler | 119/709 |
| 2,988,045 | 6/1961 | Fisher | 119/709 |
| 4,364,925 | 12/1982 | Fisher | 424/50 |
| 4,921,714 | 5/1990 | Matthews et al. | |
| 5,026,572 | 6/1991 | Neiberger | |
| 5,186,124 | 2/1993 | Woodford | 119/707 |
| 5,200,212 | 4/1993 | Axelrod | 426/2 |
| 5,240,720 | 8/1993 | Axelrod | 426/2 |
| 5,290,584 | 3/1994 | Ray | |
| 5,339,771 | 8/1994 | Axelrod | |

FOREIGN PATENT DOCUMENTS 674261  11/1963  Canada ............................. 119/709

OTHER PUBLICATIONS

Discount Master Animal Care Catalog, pp.74–79, publication date unknown.

*Primary Examiner*—Thomas Price
*Attorney, Agent, or Firm*—Banner & Witcoff, Ltd.

[57] ABSTRACT

Chew toys for domestic carnivorous animals having rawhide and jerky sheets or members. The jerky sheets are wrapped in a rawhide sheet by either rolling or folding. This provides an outer layer of rawhide containing jerky therein. A seam is created in rawhide outer layer by the rolling or folding of the rawhide sheet. The jerky preferably extends through this seam to provide an initial attractive odor and taste for the dog and provide an immediate starting point for chewing. The benefits of the jerky and the rawhide are maximized throughout the entire chewing process of the chew toy. Dogs are highly attracted to the scent and taste of jerky, which causes the dog to chew on the rawhide for extended periods of time. This better satisfies the dog's instinctive urge to chew, channeling it in a healthy direction, while simultaneously reducing the tartar on their teeth. The jerky is positioned with respect to the rawhide to enable the odor and taste sensations of the jerky to always be present and fresh to the dog.

20 Claims, 2 Drawing Sheets

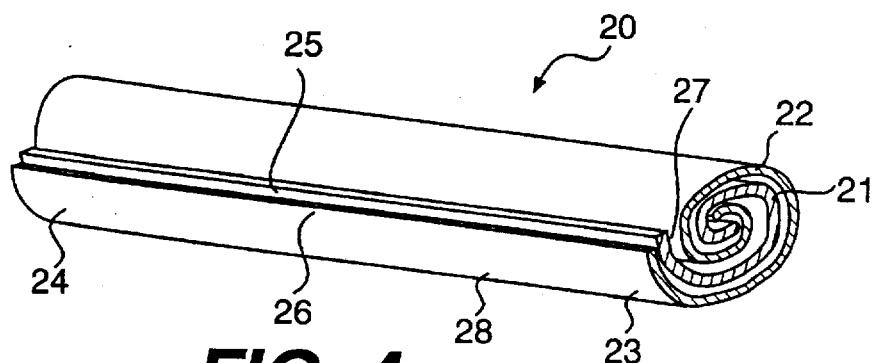
FIG. 4
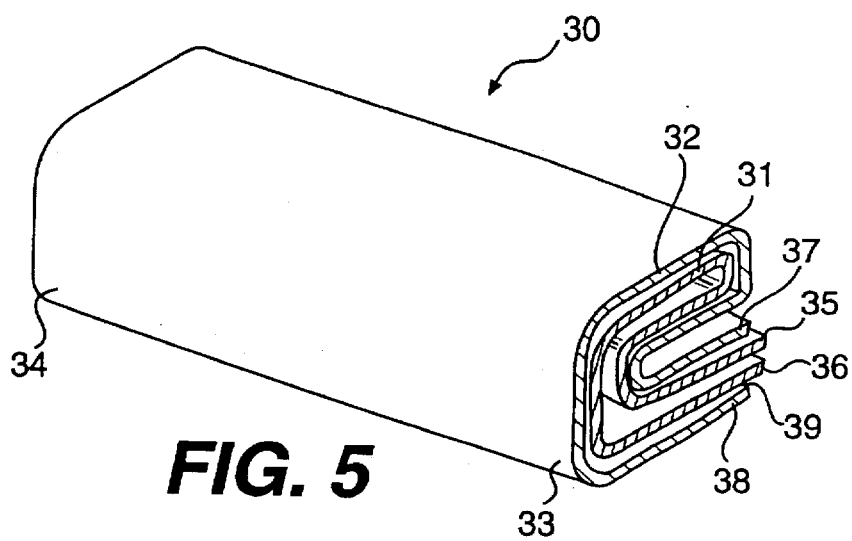
FIG. 5
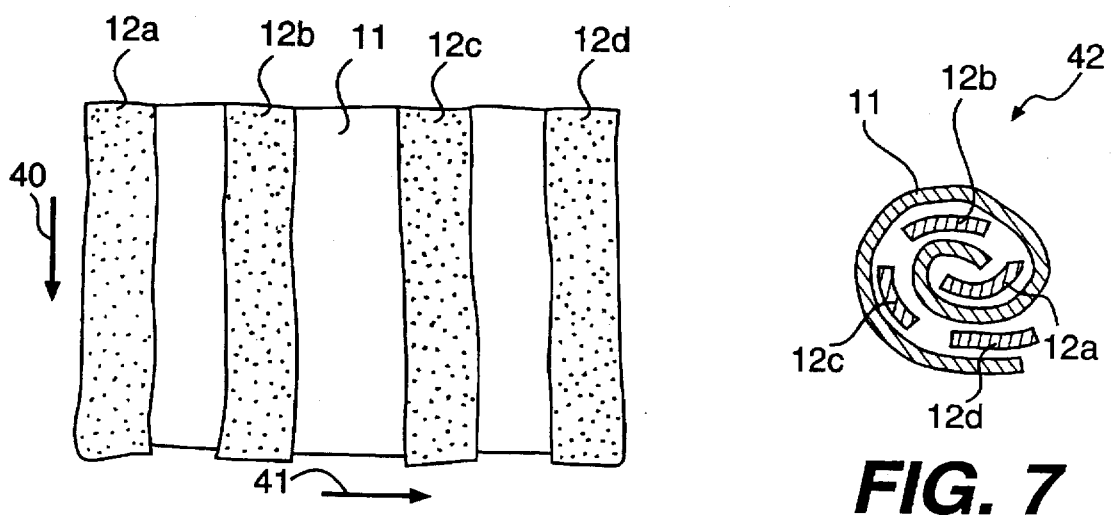
FIG. 6
FIG. 7

5,673,653

CHEW TOYS FOR DOMESTIC CARNIVOROUS ANIMALS AND METHOD FOR MAKING SAME

FIELD OF INVENTION

This invention relates to chew toys for domestic carnivorous animals and a method for making the chew toys. More particularly, this invention relates to rawhide chew toys primarily for dogs, which are appetizing and long-lasting, and satisfy their instinctive need to chew.

BACKGROUND OF THE INVENTION

Carnivorous domestically-trained animals, primarily dogs, have a basic instinct to chew. Chew toys have been used for many years to channel that instinctive urge to chew in a healthy direction and provide them with exercise for their jaws. "Chew toys" are intended to be chewed by a dog for an extended period of time, and should be distinguished from "treats" which are intended to be chewed by a dog for a relatively short period of time and digested. Chew toys typically fall within two distinct categories: (i) those consisting of synthetic materials and (ii) those consisting at least in part of animal skin or parts or the like. However, as explained below, existing chew toys include various disadvantages making them unsatisfactory in many instances.

Prior chew toys have been manufactured utilizing rubber, polyurethane, latex, nylon, other plastics, and other types of synthetic material. While chew toys consisting of these synthetic materials may be long-lasting and resistant to disintegration, they are typically odorless and tasteless. Most dogs do not get excited about these chew toys because of their odorless and tasteless aspects. Accordingly, many dogs will not chew on these toys, or will only chew on these toys for short periods of time. Further, the synthetic nature of these chew toys makes them difficult and/or dangerous to digest. Thus, small pieces of these chew toys which break off can potentially cause digestive dangers to the animals. Additionally, these chew toys are not biodegradable and are therefore bad for the environment.

Chew toys have also been comprised of portions of deceased animals. Of these types of chew toys, rawhide is a commonly used material. One such chew toy is disclosed in U.S. Pat. No. 2,988,045 to Fisher and shown in FIG. 1 herein. This chew toy includes a rolled and knotted sheet of rawhide. To make the bone, a sheet of wet rawhide is rolled into a cylindrical form 1, and while it is still wet, at least one of the ends 2 is knotted 3 to simulate an animal joint. The rolled and knotted rawhide is then dried.

Chew toys consisting solely of rawhide may be more appealing and easier to digest than synthetic chew toys. However, many dogs find these chew toys to lack of substantial flavor and odor. Accordingly, many dogs become bored with these chew toys after a while and will at most only chew on them for short periods of time.

Some manufacturers have coated or basted the rawhide chew toys with various flavors to provide additional odor or flavor and entice dogs to chew longer. For example, some rawhide chew toys are basted in a hickory-flavored marinade to enhance their flavor and odor. Other rawhide chew toys have been coated in a cheese-flavored substance. However, these basted and coated chew toys are disadvantageous for many pet owners as they can stain carpets and other items in a house. Further, these coated and basted chew toys are undesirable for many pet owners because they become malodorous to humans.

Accordingly, a chew toy which overcomes the problems and disadvantages of the prior art was thus needed.

SUMMARY OF THE INVENTION

It is an objective of the present invention to create a chew toy for domestic carnivorous animals, e.g., dogs, which overcomes the drawbacks of existing chew toys.

It is an objective of the present invention to provide a rawhide chew toy which enhances a dog's desire to chew the toy for extended periods of time.

Another objective of the present invention is to provide a chew toy which is biodegradable and is completely safe to be ingested by dogs.

It is yet another objective of the present invention to provide a chew toy for dogs which is not coated or basted and which does not stain carpets and other household articles.

It is an objective of the present invention to combine the individual advantages of jerky and rawhide in a single chew toy to provide a superior chew toy which fully satisfies a dog's instinctive urge to chew.

It is an objective of the present invention to provide a chew toy with a high content of rawhide tending to reduce the tartar on teeth of the dogs chewing the toy.

In one aspect, the chew toy of the present invention a sheet member is comprised of a rawhide sheet member and a member comprised of jerky. The jerky member is wrapped in the rawhide sheet member.

In another aspect of the present invention, a chew toy for domestic carnivorous animals includes an outer layer and an inner member. The outer layer is comprised of rawhide, and includes a longitudinal seam therein. The inner member is comprised of a meat product, and is retained substantially within the outer layer. A portion of the inner member extends through the seam in the outer layer and is exposed outside the outer layer.

In yet another aspect, the present invention provides a method of forming a chew toy for domestic carnivorous animals. The method includes the steps of providing a sheet member of rawhide and a sheet member consisting of jerky. The rawhide and jerky sheets are placed in a superimposed relationship. The two sheet members are moved together to wrap the jerky sheet member with the rawhide sheet member.

BRIEF DESCRIPTION OF THE DRAWINGS

FIG. 4 is a perspective view of a second embodiment of a chew toy of the present invention;

FIG. 5 is a perspective view of a third embodiment of a chew toy of the present invention;

FIG. 6 is a top plan view of the chew toy of FIG. 1 in an intermediate stage of manufacture; and FIG. 7 is a cross-sectional view of another embodiment of the chew toy of the present invention.

DETAILED DESCRIPTION OF THE PREFERRED EMBODIMENT

Figure 1:
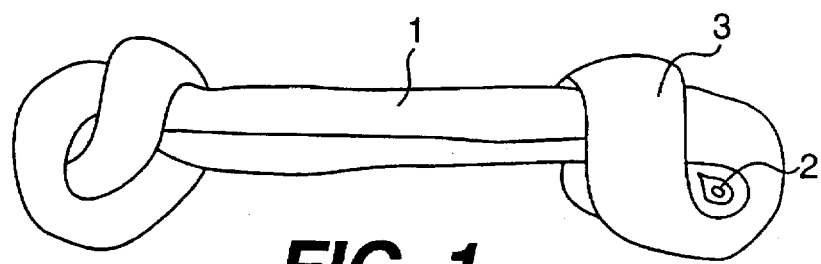
FIG. 1 is a front elevational view of a prior art rawhide chew toy.

In the present invention, as pictured in FIGS. 2–6, a chew toy for domestic carnivorous animals, e.g., dogs, is designated generally by reference numerals 10 (FIGS. 2 and 3), 20 (FIG. 4), and 30 (FIG. 5). In each embodiment, the chew toy includes a combination of rawhide and jerky members. Jerky is an extremely appetizing treat for dogs, and the smell and taste of the jerky constantly entices the dog to chew the toy. The jerky is wrapped in the rawhide in a manner which provides the chew toy with an appealing taste and scent for the dog throughout the entire chewing process of the chew toy. The rigidity and other properties of the rawhide satisfies the dog's inherent urge to chew and channels that urge in a healthy direction.

It should be noted that the term "jerky" as used herein is defined as including "traditional jerky" and "kippered jerky". "Traditional jerky" as defined herein typically consists of beef, chicken, turkey, fish, or another animal meat which is cut into strips. The sliced meat may be flavored using spices and/or a marinade and is dried via a smoker or another manner. "Kippered jerky" as defined herein includes chopped pieces of meat, chicken, turkey, fish, etc., which is mixed together with spices and fillers. The mixture is forced through a sausage press (without casing) or other press, typically into a flat form instead of round. This flat product may then be smoked or dried in another manner.

Figure 2:
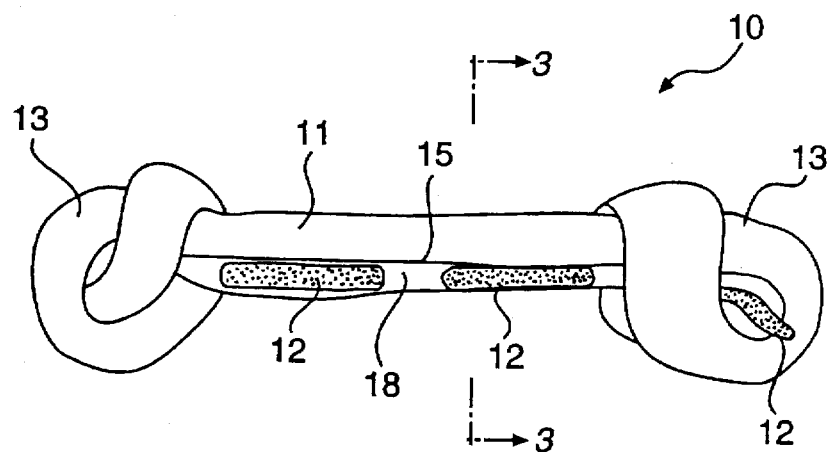
FIG. 2 is a front elevational view of a chew toy of the present invention.
Figure 3:
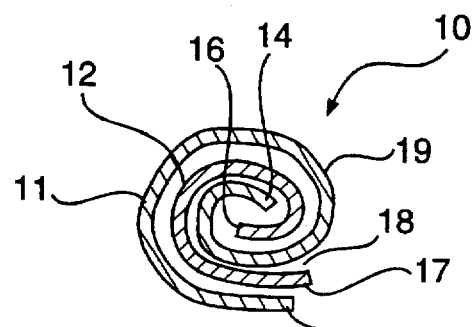
FIG. 3 is a cross-sectional view of a chew toy of the present invention taken through line 3—3 of FIG. 2.

As shown in FIGS. 2 and 3, chew toy 10 includes a rawhide sheet 11 and at least one jerky member or sheet 12 which are rolled and knotted at both its longitudinal ends 13. As best shown in FIG. 2, the rawhide sheet 11 has a first edge or end 14 toward the center of the rolled chew toy 10, and an opposing second edge or end 15 at the outer periphery of rolled chew toy 10. Similarly, the jerky sheet 12 has a first edge or end 16 toward the center of the rolled chew toy 10, and an opposing second edge or end 17 at or near the outer periphery of rolled chew toy 10. It is preferred that the end 17 of jerky sheet 12 extends through a seam 18 formed in the outer layer 19 of chew toy 10 created by the rolling or folding of the rawhide sheet 11.

The relationship between the rawhide and jerky sheets 11 and 12 is such that the benefits of the jerky and the rawhide are maximized throughout the entire chewing process of the chew toy. Dogs are highly attracted to the scent and taste of jerky. As previously described, chewing rawhide for extended periods of time provides a healthy channel to satisfy a dog's instinctive need to chew. Chew toy 10 preferably provides jerky 12 at or near the periphery of the chew toy 10 at all times while the dog is gnawing on toy 10 to enable the odor and taste sensations of the jerky to always be present and fresh to the dog.

For example, as shown in FIG. 3, one end 17 of the jerky 12 is exposed near the end 15 of rawhide sheet 11 and another portion of the jerky 12 is located immediately below the chew toy's outer layer 19 of rawhide. This provides an initial and appealing odor to attract the dog to the chew toy before he starts to chew, and provides taste and scent attraction as the dogs begins to chew. As the dog continues to chew for extended periods of time, the rawhide being chewed, i.e., most likely the outer layer, slowly disintegrates and is digested by the dog with portions of the jerky immediately thereunder. After the outer layer of rawhide and the jerky thereunder is digested, the chew toy continues to provide a fresh attractive scent and taste as unchewed jerky is located under the second layer of rawhide and at or exposed adjacent the outer edge of the remaining rolled rawhide. Additionally, as there is a substantial amount of rolled rawhide resisting the simple consumption of the jerky, the dog will have to gnaw or chew the rawhide to get at small sections of the jerky. Thus, the dog's need to chew will be satisfied and successfully channeled in a healthy manner by chewing the rawhide, and the dog will continue to chew the rawhide for extended periods of time due to the odor and taste provided by the jerky.

Further, in some preferred embodiments, the jerky sheet 12 is positioned such that a small amount, e.g., ½ to 1 inch, of the jerky 12 projects out of the longitudinal seam 18 in the rawhide outer layer 19. The exposed jerky makes the chew toy initially more attractive to the dog from an odor and taste standpoint, and provides an immediate starting point for chewing.

Another embodiment of the present invention is shown in FIG. 4. Chew toy 20 is similar to chew toy 10 of FIGS. 2 and 3 in that one or more sheets of jerky 21 are rolled with a sheet of rawhide 22. However, unlike the knotted ends of chew toy 10, chew toy 20 has unknotted ends 23 and 24. This configuration may be preferred to some dogs. In a preferred variation of this embodiment, the jerky sheet 21 is positioned such that a small amount, e.g., ½ to 1 inch, at the end 25 of the jerky 21 projects out of the seam 27 in the outer rawhide layer 28 adjacent the outer edge 26 of the rawhide sheet 22. As described with respect to the previous embodiment, the exposed jerky makes chew toy 20 initially more attractive to the dog from an odor and taste standpoint, and provides an immediate starting point for chewing.

Chew toy 30, as shown in FIG. 5, includes one or more sheets of jerky 31 wrapped within a sheet of rawhide 32. However, unlike the being rolled like chew toys 10 or 20, chew toy 30 is folded one or more times upon itself, in lieu of being rolled. While depicted in FIG. 5 as having unknotted ends 33 and 34, it is recognized that the ends may be knotted is the length of the folded chew toy is sufficient to do so. Further, in one preferred variation of this embodiment, the jerky sheet 31 is positioned such that a small amount, e.g., ½ inch, at both ends 35 and 36 of the jerky 31 extends through a seam 39 in the outer rawhide layer, i.e., it projects past the ends 37 and 38 of the rawhide sheet 32 when folded over. While it is apparent that chew toy 30 in FIG. 5 was folded onto itself two times, it is also recognized that chew toys of the present invention may be formed by folding it once or more than two times.

Chew toys 10, 20, and 30, are preferably formed by wrapping, e.g., folding or rolling, one or more members consisting of jerky in a rawhide sheet. For example, a single sheet of jerky may be used which is of substantially the same size as the rawhide. In the alternative, a plurality of spaced or adjacent jerky sheets may be used. For example, to form the chew toy 10 of FIGS. 2 and 3, a plurality of separate jerky sheets 12a–12d, are superimposed across a sheet of rawhide 11 as shown in FIG. 6. The rawhide sheet 11 and jerky sheets 12a–12d could then be rolled in the direction of arrow 40 and knotted at its ends. This creates longitudinally-separated exposed sections of jerky 12 as shown in FIG. 2. In the alternative, jerky sheets may be placed immediately adjacent to one another to form a longitudinally-continuous exposed section of jerky as depicted in chew toy 20 of FIG. 4.

In an alternative embodiment, the jerky sheets may be wrapped in the rawhide in a direction lateral to the jerky members. For example, the arrangement of jerky sheets and rawhide shown FIG. 6, could be rolled in the direction of arrow 41 to form a chew toy 42 substantially as shown in FIG. 7. As shown in FIG. 7, this creates a chew toy 42 with the jerky members 12a–12d angularly spaced within the rawhide sheet 11. However, it is noted that regardless of wrapping direction, a single sheet of jerky may be used, and it need not be of substantially similar size to the rawhide sheet. Further, it is also possible to wrap rawhide around jerky members which are not in a sheet form, e.g., having more of a cylindrical form, and still obtain a chew toy experiencing the benefits of jerky in combination with rawhide.

To manufacture chew toys 10, 20, and 30 of the present invention, rawhide is cut into rectangles having a predetermined size depending upon the desired length and thickness of the chew toy. For example, in manufacturing chew toy 10, the length of the rectangles is equal to the nominal length of the rolled center portion plus the additional length on both ends sufficient to tie a knot at both ends of the toy 10. Additionally, the width of the rectangle is preferably sufficient for the rawhide to be rolled between 1.5 and 2 times over itself. The thickness of the rawhide may vary as a function of the length of the chew toy to provide it with sufficient and desired structural stability and stiffness. In one preferred embodiment, the thickness of the rawhide is approximately ⅛ inch. However, it is recognized that the length, width, and thickness of the rawhide may vary as desired to obtain chew toys of different shapes, configurations, and stiffnesses.

The preferred rawhide is a standard international grade, taken from the second layer cut of cow or buffalo hide. It is also preferred that the rawhide is tanned. The rawhide may further be processes as desired by dehairing, liming, etc., as is well known in the art.

The cut rawhide sheets are preferably soaked in a solution including hydrogen peroxide and chlorine to make it sufficiently malleable to manipulate as desired, e.g., fold, roll and/or knot. Each rawhide sheet is laid flat and one or more jerky members or sheets are superimposed or laid on the cut rawhide sheet in a generally superimposed relationship. For example, as shown in FIG. 6, four jerky sheets 12a-12d may be placed on a rawhide sheet 11. Depending upon the desired configuration, the jerky may be oriented in a direction along the long or the short side of the rawhide, and wrapped in the desired direction. In a preferred embodiment, the jerky sheets are preferably about ⅛" in thickness. However, it is recognized that the rawhide sheets may be thicker or thinner as desired.

In a preferred embodiment, the jerky will be a "traditional jerky", prepared in conformance with USDA regulations requiring certification of water quality, cooking and heating procedures. However, "kippered jerky" may be used in lieu of the "traditional jerky".

Prior to superimposing the jerky sheet or sheets on the rawhide, a mold inhibiting additive, for example potassium sorbate, is sprayed on the jerky to provide protection from mold growth on the jerky during the drying process of the moist rawhide.

The rawhide and jerky may then be manipulated, e.g., folded or rolled. For example, the rawhide and jerky can be rolled into a cylinder as shown in FIGS. 2 and 4. If desired, the ends can be knotted manually or mechanically. The rawhide and jerky could also be folded, either manually or mechanically, to arrive at the chew toy shown in FIG. 5.

The chew toy is then dried thoroughly in any conventional manner, e.g., it may be sun dried approximately four to seven days. The chew toy will become more rigid after it has dried and will maintain its wrapped, e.g., rolled or folded shape. After it has been dried, the chew toy is preferably air packed and/or shrink wrapped to prevent the jerky from spoiling.

As chewing rawhide for extended periods of time tends to reduce plaque and tartar on dogs' teeth, it is expected that the chew toys of the present invention will provide enhanced reduction of plaque and tartar because the dogs will tend to gnaw on the chew toys of the present invention for longer periods of time.

In some preferred embodiments, the proportion of the rawhide to jerky by weight will be between the range of 5:1 and 15:1, and more specifically, approximately 10:1. However, it is recognized that higher or lower ratios of rawhide to jerky may be used.

It is evident that the chew toy is void of synthetic material. Rawhide and jerky are biodegradable and easier of dogs to digest than synthetic materials. Accordingly, the chew toy of the present invention is more environmentally friendly and easier to digest than chew toys which include synthetic materials.

While particular embodiments of the invention have been shown and described, it is recognized that various modifications thereof will occur to those skilled in the art. For example, it is possible to make the chew toy of the present invention in other configurations than the ones depicted in the drawing figures. Therefore, the scope of the herein-described invention shall be limited solely by the claims appended hereto.

I claim:

1. A chew toy for domestic carnivorous animals comprising:
   a sheet member comprised of rawhide;
   a member comprised of jerky;
   said jerky member being wrapped in said rawhide sheet member.

2. The chew toy of claim 1, wherein said jerky member comprises at least one sheet member.

3. The chew toy of claim 2, further comprising a plurality of jerky sheet members.

4. The chew toy of claim 2, wherein said rawhide sheet member and said jerky sheet member are disposed in a rolled relationship creating a rolled chew toy.

5. The chew toy of claim 4, wherein said rolled chew toy is elongated having first and second ends, said first and second ends including knots therein.

6. The chew toy of claim 5, wherein said jerky member is comprised of traditional jerky.

7. The chew toy of claim 2, wherein said rawhide sheet member and said jerky sheet member are disposed in a folded relationship.

8. The chew toy of claim 1, wherein the proportion of rawhide material to jerky material by weight is in the range between 5:1 and 15:1.

9. The chew toy of claim 1, wherein said jerky material is traditional jerky.

10. The chew toy of claim 1, wherein said chew toy is void of synthetic material.

11. A method of forming a chew toy for domestic carnivorous animals, said method comprising the steps of:
    providing a sheet member of rawhide;
    providing a sheet member consisting of jerky;
    placing the sheets of rawhide and jerky in superimposed relationship; and
    moving the two sheet members together to wrap the jerky sheet member with the rawhide sheet member.

12. The method of claim 11, wherein said moving step comprises rolling the rawhide and jerky sheet members.

13. The method of claim 12, further comprising the step of tying knots in the ends of the rolled rawhide and jerky sheet members.

14. The method of claim 11, wherein said moving step comprises folding the rawhide and jerky sheet members.

15. The method of claim 11, wherein said placing step comprises positioning the jerky sheet member to overhang the rawhide sheet member such that a portion of the jerky sheet member is visible after the sheet members are moved and the jerky sheet member is wrapped in the rawhide sheet member.

16. The method of claim 11, further comprising providing a plurality of sheet members consisting of jerky material; placing the jerky sheet members in superimposed relationship with the rawhide sheet members; and moving the rawhide sheet members and the jerky sheet members together to wrap the jerky sheet members with the rawhide sheet member.

17. The method of claim 11, further comprising the steps (i) soaking the rawhide sheet member prior to said moving step to enhance its malleability, and (ii) drying the rawhide sheet member after said moving step.

18. The method of claim 17, further comprising the step of spraying a mold inhibiting additive on the jerky sheet member prior to said drying and moving steps.

19. A chew toy for domestic carnivorous animals, said chew toy comprising:
- an outer layer comprised of rawhide, said outer layer including a longitudinal seam therein;
- an inner member comprised of a meat product, said inner member retained substantially within said outer layer;
- a portion of said inner member extending through said seam in said outer layer and exposed outside said outer layer.

20. The chew toy of claim 19, said outer layer including a sheet of rawhide, said inner member comprised of jerky, said inner member wrapped in said sheet of rawhide.

* * * * *